United States Patent [19]

Wu

[11] Patent Number: 5,444,370
[45] Date of Patent: Aug. 22, 1995

[54] MAGNETIC ANGULAR POSITON SENSOR WITH TWO MAGNETICALLY SENSITIVE COMPNENTS ARRANGED PROXIMATE TWO TARGET TRACKS HAVING COMPLIMENTARY MAGNETIC AND NONMAGNETIC SEGMENTS

[75] Inventor: Mien T. Wu, Dane County, Wis.

[73] Assignee: Honeywell Inc., Minneapolis, Minn.

[21] Appl. No.: 32,883

[22] Filed: Mar. 18, 1993

[51] Int. Cl.$^6$ .......................... G01B 7/30; G01B 7/14; G01P 3/44; F02P 17/00
[52] U.S. Cl. ............................ 324/207.2; 324/207.25; 123/617
[58] Field of Search ........... 324/207.2, 207.21, 207.25, 324/173, 174, 235, 251, 252; 338/32 R, 32 H; 123/617, 414

[56] References Cited

U.S. PATENT DOCUMENTS

| | | | |
|---|---|---|---|
| 4,518,918 | 5/1985 | Auery | 324/207.2 |
| 4,786,870 | 11/1988 | Kawamata et al. | 324/207.21 |
| 4,833,405 | 5/1989 | Richards et al. | 324/207.25 |
| 5,140,262 | 8/1992 | Stolfus . | |
| 5,159,268 | 10/1992 | Wu . | |
| 5,164,668 | 11/1992 | Alfors . | |

*Primary Examiner*—Walter E. Snow
*Attorney, Agent, or Firm*—William D. Lanyi

[57] ABSTRACT

A magnetic sensor is provided with two target tracks arranged in generally parallel association with each other. Each of the target tracks comprises magnetic and nonmagnetic segments which are arranged in alternating patterns. Each magnetic segment of the first target track is disposed alongside a nonmagnetic segment of the second target track and each magnetic segment of the second target track is disposed alongside a nonmagnetic segment of the first target track. First and second magnetically sensitive components are disposed proximate the first and second target tracks, respectively, and a source of a magnetic field is disposed proximate the first and second magnetically sensitive components. Distortions of the magnetic field imposed perpendicularly on the first and second magnetically sensitive components are used to provide first and second output signals therefrom. A third output signal, which is a function of the first and second output signals, is used to determine the location of the first and second target tracks with respect to the first and second magnetically sensitive components. The magnetic and nonmagnetic segments of the first and second target tracks can be different sizes and arranged in a pattern which permits the specific and absolute location of a moveable object to be determined.

16 Claims, 7 Drawing Sheets

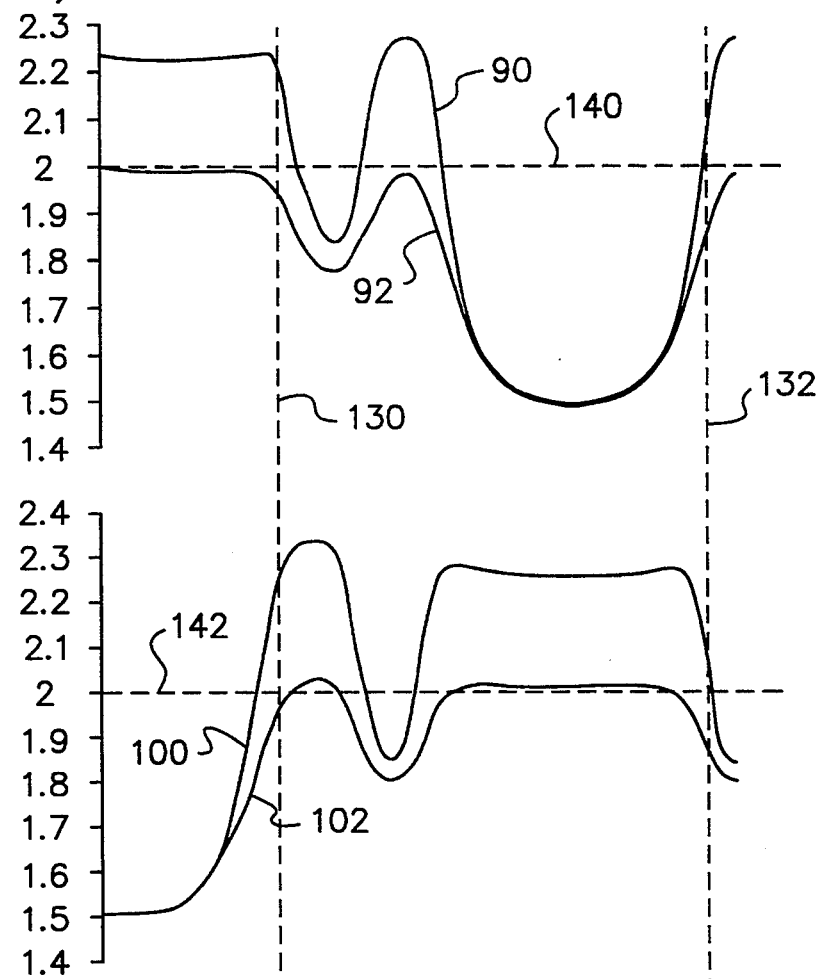
Fig. 6
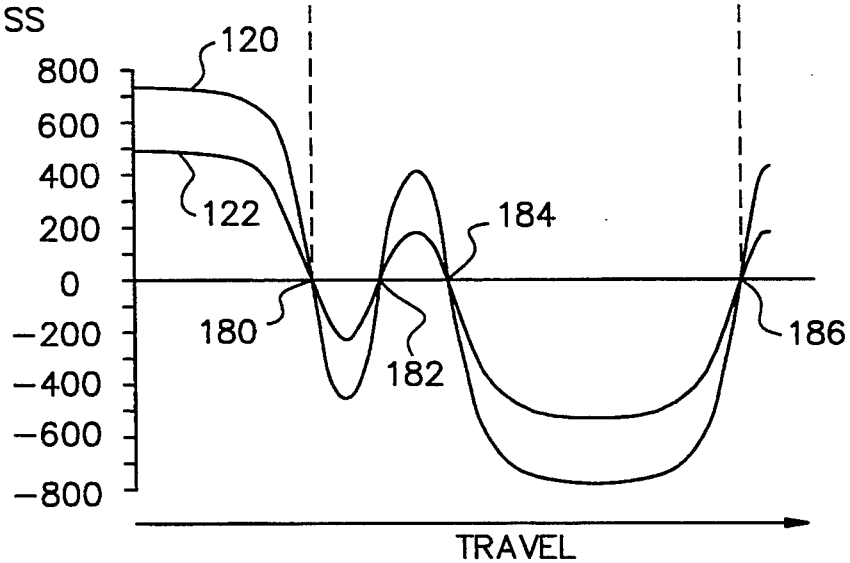

MAGNETIC ANGULAR POSITON SENSOR WITH TWO MAGNETICALLY SENSITIVE COMPNENTS ARRANGED PROXIMATE TWO TARGET TRACKS HAVING COMPLIMENTARY MAGNETIC AND NONMAGNETIC SEGMENTS

BACKGROUND OF THE INVENTION

1. Field of the Invention

The present invention relates generally to magnetic position sensors, and, more particularly, to a magnetic position sensor which utilizes two generally parallel target tracks in conjunction with two magnetically sensitive components arranged with a biasing magnet.

2. Description of the Prior Art

Many different types of magnetic position sensors are known to those skilled in the art. In one particular adaptation of a magnetic position sensor, one or more magnetically sensitive devices, such as Hall effect components, are arranged proximate a moving target of magnetic material and a permanent magnet is used to provide a biasing magnetic field which is distorted in response to movement of magnetic material through the field. This type of configuration is commonly used in association with geartooth sensors, wherein a Hall effect element is disposed proximate the teeth of a moving gear with a permanent magnet disposed proximate the Hall effect element to provide a magnetic field which passes through the Hall effect element and the teeth of the gear. As the gear rotates, successive teeth and interstitial gaps move past the Hall effect element. Typically, the Hall effect element is disposed between the gear and the source of the magnetic field, such as a permanent magnet. As the gear teeth pass through the magnetic field, the field is distorted and the direction and strength of the field passing perpendicularly through the Hall effect elements is caused to change in response to the moving gear teeth. Since Hall effect elements commonly provide an output signal that is representative of the magnetic field strength perpendicular to the Hall effect element, the output signal can then be interrogated to determine the presence of gearteeth or interstitial gaps at a particular position relative to the Hall effect element.

U.S. Pat. No. 5,140,262, which issued to Stolfus on Aug. 18, 1992, describes a geartooth sensor with a centerline in nonintersecting relation with a center of rotation of a rotatable member. The off axis geartooth sensor is provided with a centerline of the sensor disposed along a line which is not coincident with the center of rotation of the rotatable member to be sensed. Instead, the centerline of the housing in which a Hall effect element is disposed is pointed at a perpendicular distance from the center of rotation of the rotatable member which is determined as the function of a range of dimensions which define the allowable gap between the Hall effect element and a surface of the rotatable member.

U.S. patent application Ser. No. 07/865,010 (M10-14049) which was filed on Apr. 8, 1992, now U.S. Pat. No. 5,304,926, by Wu and assigned to the assignee of the present application, discloses a position sensor which is provided with two magnetically sensitive devices associated with a magnet. The sensor is disposable proximate a rotatable member having at least one discontinuity in its surface. The two magnetically sensitive devices, which can be Hall effect transducers, each provide output signals that represent the direction and magnitude of the magnetic field in which its respective transducer is disposed. An algebraic sum of the first and second output signals from the magnetically sensitive devices is provided as an indication of the location of the rotatable member that is disposed proximate the sensor.

U.S. patent application Ser. No. 07/952,449 (M10-15101), which was filed by Wu on Sep. 29, 1992, now U.S. Pat. No. 5,341,097, discloses a geartooth sensor which incorporates a magnet and two magnetically sensitive devices, such as Hall effect elements. The two magnetically sensitive devices are disposed in a common plane with each other with one of the devices being located at a position closer to the magnet than the other device. The common plane in which both magnetically sensitive devices are disposed is faced apart from a central axis of the magnet by a predetermined distance. A means is provided for determining a ratio of the magnetic field strengths that are imposed perpendicularly on the first and second magnetically sensitive devices. The ratio is used to distinguish between teeth and slots proximate the sensor, wherein the common plane of the magnetically sensitive devices is generally perpendicular to the path along which the teeth and slots pass.

U.S. Pat. No. 5,164,668, which issued to Alfors on Nov. 17, 1992, describes an angular position sensor with decreased sensitivity to shaft position variability. The angular position sensor is provided with first and second pole pieces that extend from regions proximate a rotatable magnet to regions proximate a magnetically sensitive device. The pole pieces provide defined magnetic paths of lowered reluctance that confine the lines of flux extending between the rotatable magnet and the magnetically sensitive device. The placement of the rotatable magnet between first and second pole piece segments of the invention significantly reduces the sensitivity of the sensor to variations in possession of the rotatable magnet and therefore increases the reliability of the measurement system.

U.S. Pat. No. 5,159,268, which issued to Wu on Oct. 17, 1992, describes a rotational position sensor with a Hall effect device and a shaped magnet. A Hall effect device is provided for use as a rotary position sensor in cooperation with a shaped magnet that imposes a magnetic field on the Hall effect device which is generally linear and proportional to the angular position of the shaped magnet. Two alternative embodiments are described and illustrated which both provide a high degree of linearity between the electrical output of the Hall effect device and the rotational position of the shaped magnet. One of the alternative embodiments is generally oblong and the other alternative embodiment is generally bell shaped. Both of these alternative embodiments exhibit a high degree of linearity between the strength of the magnetic field imposed on a Hall effect element and the rotational, or angular, position of the angular magnet.

In applications of the type described above, the strength of the magnetic field perpendicular to the Hall effect element is caused to change from one positive magnitude of a magnetic field to a greater or slightly lesser positive magnitude of magnetic field. The change in magnetic field strength causes a measurable change in the output of the Hall effect component. This change in output signal can be used to determine whether a tooth or a gap is proximate the sensor.

Certain applications of sensors of this general type incorporate moving targets which comprise unequal spaced and sized teeth or magnetic segments. The use of unequal magnetic segments permits the moveable target device to provide a code which permits the system to more accurately determine the position of the target. For example, if certain teeth or segments are larger than others, the smaller and larger segments can be arranged in a predefined pattern to permit the device to more accurately determine the position of the target without requiring a complete cycle of the teeth or segments.

SUMMARY OF THE INVENTION

The present invention provides a position sensor which uses a moveable object that has first and second target tracks disposed thereon. The target tracks each comprise a plurality of magnetic and nonmagnetic segments alternately disposed to provide a recognizable pattern. The first and second target tracks are generally arranged in parallel association with each other. Each magnetic segment of the first target track is disposed alongside a nonmagnetic segment of the second target track and each nonmagnetic segment of the first target track is disposed alongside a magnetic segment of the second target track. Both the first and second target tracks are arranged in parallel association with the direction of travel of the moveable object. A first magnetically sensitive component, such as a first Hall effect element, is disposed proximate the first target track and a second magnetically sensitive component, such as a second Hall effect element, is disposed proximate the second target track. Both the first and second magnetically sensitive components provide output signals that are representative of the magnetic field strength perpendicular to the associated magnetically sensitive component. The present invention also comprises a source of magnetic field disposed proximate the first and second magnetically sensitive components so that a permanent bias field is imposed on the Hall effect elements. A means for providing a third output signal is also used, wherein the third output signal is a function of the first and second output signals of the first and second magnetically sensitive components, respectively.

In one particularly preferred embodiment of the present invention, the third output signal is representative of the algebraic difference between the first and second output signals. However, it should be understood that the third output signal could also be generally representative of the ratio of the first and second output signals.

Although in one particularly preferred embodiment of the present invention the moveable object is a generally circular device which is rotatable about an axis of rotation, it should be understood that the object could also be arranged to move linearly past the Hall effect elements. The Hall effect elements are arranged proximate their respective target tracks in such a way that the presence of a magnetic segment immediately proximate the first Hall effect element is coincident with the presence of a nonmagnetic segment proximate the second Hall effect element. Alternatively, when a nonmagnetic segment passes immediately proximate the first Hall effect element, a magnetic segment of the second target track passes immediately proximate the second Hall effect element. This arrangement of magnetic and nonmagnetic segments and the relative position of the Hall effect elements to the first and second target tracks always provides a distinct difference between the signals at the outputs of the two Hall effect components.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Figure 1:
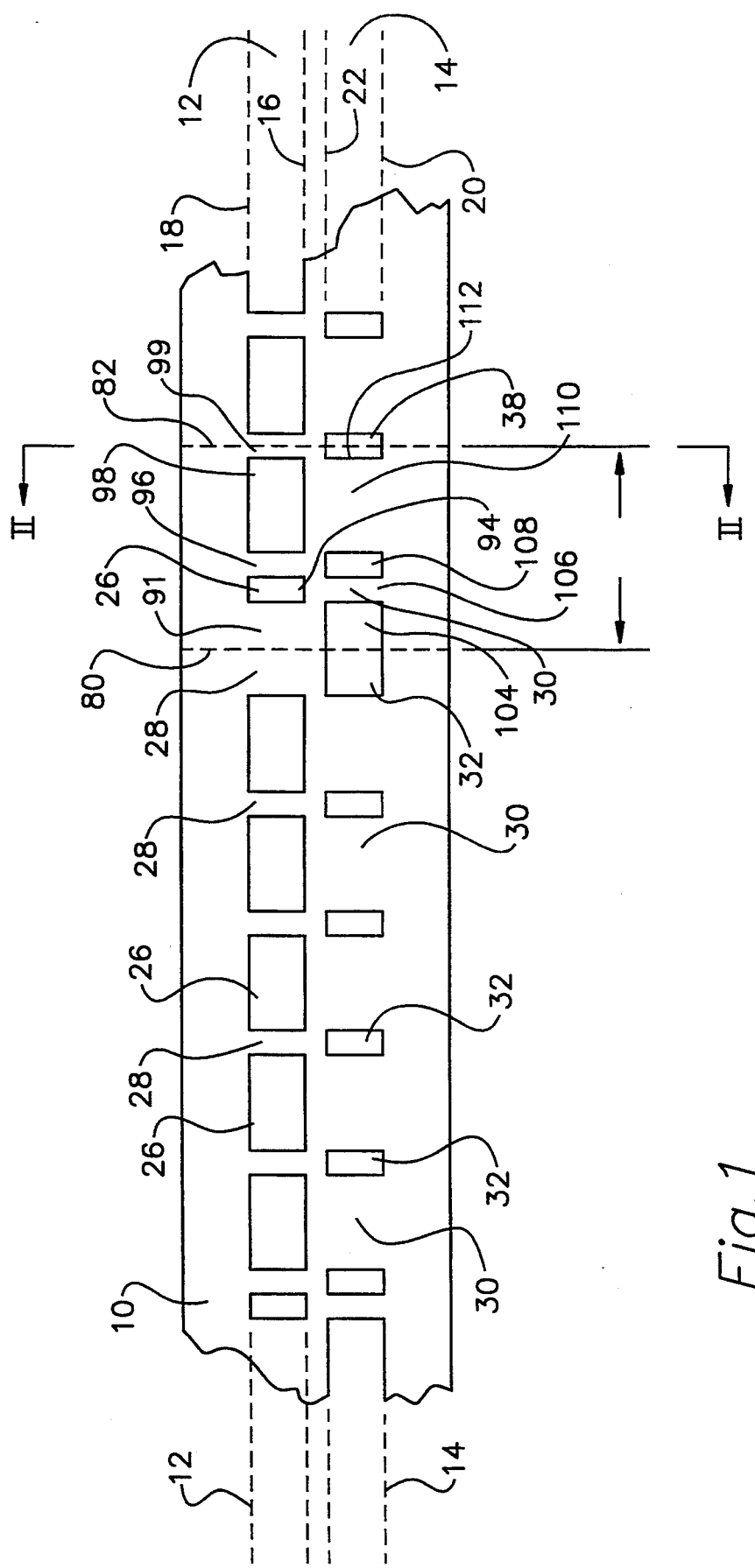
FIG. 1 illustrates a moveable object with first and second target tracks configured in conformance with the present invention.

Throughout the Description of the Preferred Embodiment, like components will be identified by like reference numerals.

FIG. 1 illustrates a moveable object 10 which comprises a first target track 12 and a second target track 14. For purposes of the illustration in FIG. 1, the first target track is identified by dashed lines 16 and 18. The second target track 14 is identified by dashed lines 20 and 22. The first target track 12 comprises a plurality of magnetic and nonmagnetic segments. For example, reference numeral 26 identifies nonmagnetic segments the first target track and reference numeral 28 identifies magnetic segments of the first target track. In the illustration of FIG. 1, the nonmagnetic segments 26 of the first target track are defined by holes extending through the moveable object 10 and the magnetic segments 28 are defined as portions of the magnetic material of the moveable object 10.

With continued reference to FIG. 1, the magnetic segments of the second target track 14 are identified by reference numeral 30 and the nonmagnetic segments of the second target track 14 are identified by reference numeral 32. As in the first target track 12, the nonmagnetic segments 32 of the second target track 14 are defined by openings extending through the moveable object 10 and the magnetic segments 30 are defined by portions of the magnetic material of moveable object 10. The first and second target tracks are disposed in generally parallel association with each other as shown. The representation in FIG. 1 illustrates a moveable object 10 which is a generally flat strip of magnetic material. However, it should be understood that the strip of magnetic material could also be formed in a generally circular, or hoop, pattern with the first and second target tracks, 12 and 14, extending around the moveable object at two generally parallel circumferences.

Figure 2:
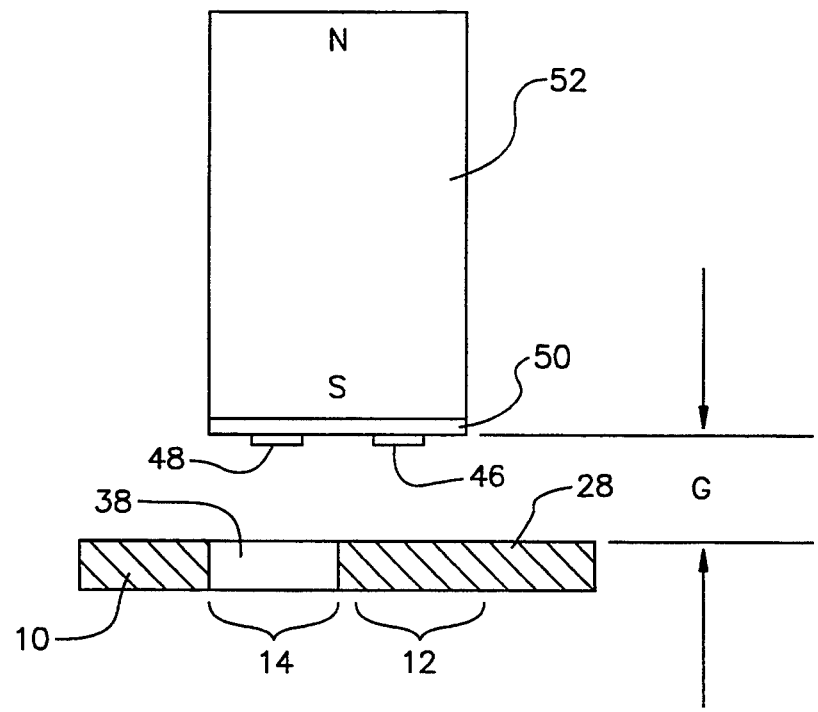
FIG. 2 is a sectional view of the moveable object of FIG. 1 along with the sensor of the present invention.

FIG. 2 is a sectional view of a portion of the moveable object 10 shown in FIG. 1. In addition, FIG. 2 shows a sensor disposed proximate the moveable object 10. With reference to FIGS. 1 and 2, one of the plurality of nonmagnetic segments 32 of the second target track 14 is identified by reference numeral 38 in FIG. 2. The section view is taken through the moveable object 10 and through the nonmagnetic segment 38. In FIG. 2, it can be seen that the nonmagnetic segment 38 is an opening extending through the thickness of the moveable object 10.

With continued reference to FIG. 2, it can be seen that a first magnetically sensitive component 46 is disposed proximate the first target track 12 and a second magnetically sensitive component 48 is disposed proximate the second target track 14. The magnetically sensitive components, which are Hall effect elements or permalloy devices in a preferred embodiment of the present invention, are disposed proximate the moveable object 10 with a gap G therebetween. Although the gap G is illustrated as being relatively large with respect to the thickness of the moveable object 10, it should be understood that this large representation of gap G is for illustration purposes only and, in actual applications of the present invention, is much smaller than illustrated in FIG. 2. The Hall effect elements are disposed on a substrate 50 which can be a ceramic component or a printed circuit board. Substrate 50 is, in turn, attached to a source of a magnetic field which, in the illustration of FIG. 2, is a permanent magnet 52. Although not shown in FIG. 2, the permanent magnet 52 provides a magnetic field which extends through both Hall effect elements and into the moveable object 10. As is well known to those skilled in the art, the presence of a nonmagnetic segment such as that identified by reference numeral 38 causes the magnetic field to pass through an associated magnetically sensitive component, such as that identified by reference numeral 48, in a way which is different than if a magnetic segment is disposed proximate the magnetically sensitive component. In other words, the strength of the magnetic field passing through magnetically sensitive component 48 in FIG. 2 would be measurably different than the strength of the magnetic field passing perpendicularly through magnetically sensitive component 46 because magnetically sensitive component 46 is proximate a magnetic segment of the moveable object 10, whereas magnetically sensitive component 48 is proximate a nonmagnetic segment 38. This difference in magnetic field strength perpendicular to the Hall effect elements permits the detection of the presence of either magnetic segments or nonmagnetic segments proximate the Hall effect elements.

In magnetic sensors of this general type, if a single Hall effect element is used the change in field strength perpendicular to the magnetically sensitive component is sometimes insufficient to determine the size of the segment. Therefore, if a device is used in association with a series of magnetic and nonmagnetic segments, such as gearteeth and interstitial gaps, different sized gearteeth and gaps are not always easily distinguishable from each other. However, since the present invention always disposes a segment proximate the first magnetically sensitive component which is magnetically opposite to the segment disposed proximate the second magnetically sensitive component, a very distinct magnetic difference is caused to be present and the output signals of the magnetically sensitive components are also caused to be distinctly different from each other. This exaggerated difference in output signals between the first and second magnetically sensitive components, which is provided by the configuration of the first and second target tracks, makes it considerably easier for the present invention to distinguish both the presence and absence of magnetic segments of the moveable object 10 and, in addition, permits the relative sizes of the segments to be more easily determined. This, in turn, permits the use of a pattern of small and large magnetic and nonmagnetic segments, such as those shown in FIG. 1, to be used in a way which permits the position of the moveable object 10 to be determined with a higher degree of accuracy than would be possible without the use of the first and second target tracks configured as described above.

Figure 3:
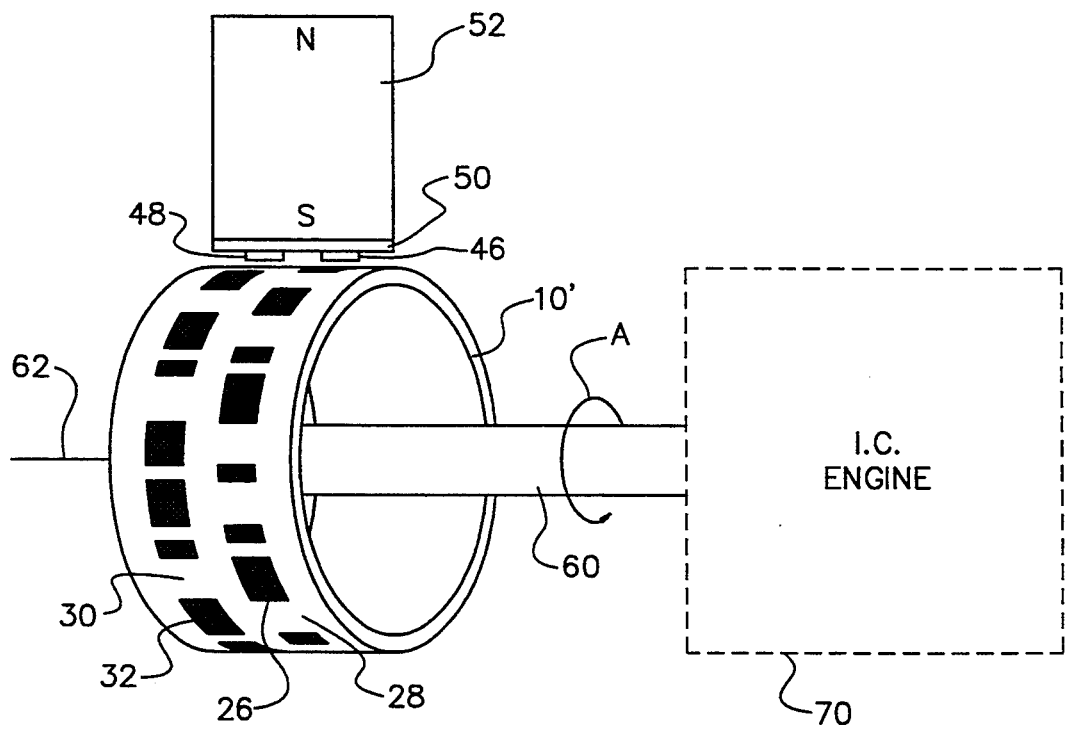
FIG. 3 is an alternative embodiment of the present invention which uses generally circular target tracks disposed on the outer cylindrical periphery of a generally round moveable object.

FIG. 3 illustrates an alternative embodiment of the present invention in which the moveable object is arranged in a circular pattern instead of a linear pattern. In other words, the moveable object 10 shown in FIG. 1 is generally linear and shaped for the movement of the first and second target tracks in a linear pattern from left to right in FIG. 1 or visa versa. However, the moveable object 10' shown in FIG. 3 is arranged in a circular shape to permit its attachment to a rotatable shaft 60 which is configured to rotate about a central axis 62. The first target track comprises magnetic 28 and nonmagnetic 26 segments. The nonmagnetic segments are illustrated by darkened rectangles in FIG. 3 and the magnetic segments are illustrated as the spaces between them. The precise method for providing the magnetic and nonmagnetic segments is not a limiting characteristic of the present invention. The magnetic segments of the second target track are identified by reference numeral 30 and the nonmagnetic segments are illustrated as darkened rectangles and identified by reference numeral 32. The first and second target tracks are disposed in generally parallel association with each other and both target tracks are generally parallel to the direction of their travel. Although it is recognized that the generally circumferential target tracks shown in FIG. 3 are not strictly arranged on parallel patterns because they are actually disposed on a cylindrical surface, they will be described herein as being parallel to each other and to their directions of travel because the operation of the present invention is generally the same whether the target tracks are arranged as illustrated in FIG. 1 or as illustrated in FIG. 3.

With continued reference to FIG. 3, it can be seen that the first magnetically sensitive component 46 is disposed proximate the first target track and magnetically sensitive component 48 is disposed proximate the second target track. As the moveable objects 10' rotates with shaft 60 as illustrated by arrow A, the magnetic and nonmagnetic segments of the first and second target tracks are sequentially disposed immediately proximate the first and second magnetically sensitive components. It can also be seen that whenever a magnetic segment of the first target track is disposed proximate the first magnetically sensitive component 46, a nonmagnetic segment of the second target track is disposed proximate magnetically sensitive component 48. In this way, the two magnetically sensitive components are always exposed to segments of opposite magnetic characteristic. This presentation of opposite magnetic characteristics to the first and second magnetically sensitive components permits a significant distinction to be measured between the output signals from the two magnetically sensitive components, 46 and 48. The advantage of this technique will be described in greater detail below in conjunction with FIGS. 4, 5 and 6.

With continued reference to FIG. 3, it should be understood that rotatable shaft 60 can be driven by a motive source, such as the internal combustion engine 70, which is represented by dashed lines in FIG. 3. Although many different types of motive sources can be associated with shaft 60, one particular application of the present invention finds beneficial use in association with an automobile engine in which the present invention is used to determine the rotational position of a shaft 60 which can be a cam shaft, a drive shaft or a crank shaft. The use of the present invention therefore permits an accurate measurement of the angular position of shaft 60 for purposes of the automatic control of components related to the internal combustion engine 70.

Figure 4:
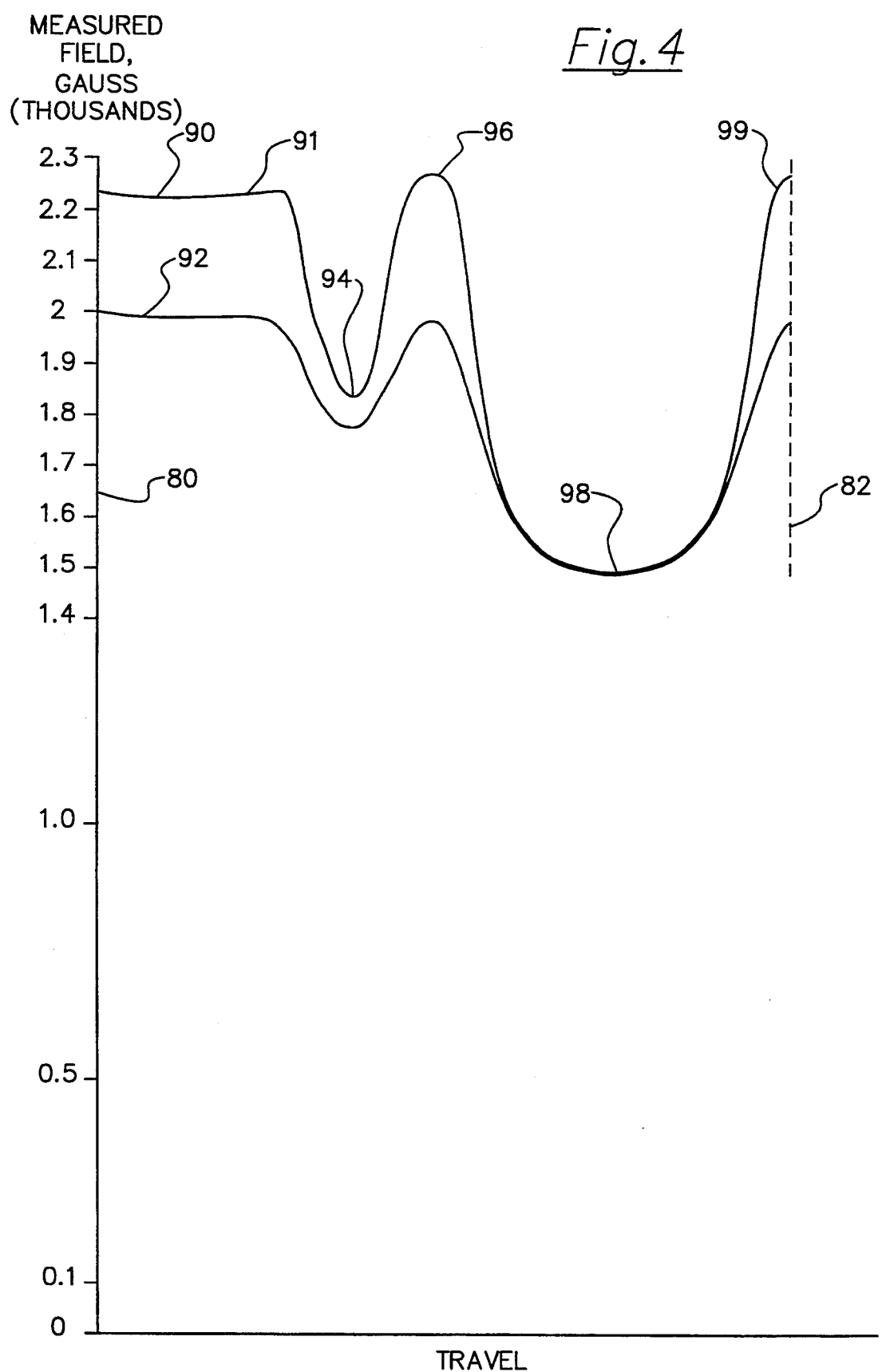
FIG. 4 shows representative curves of a first output signal of the present invention.

With reference to FIG. 1, it can be seen that two dashed lines, 80 and 82, identify a particular segment of the moveable object 10 therebetween. Although the magnet 52, the substrate 50 and the first and second magnetically sensitive components, 46 and 48, are not illustrated in FIG. 1, it can easily be imagined that the first and second magnetically sensitive components are disposed proximate the first and second target tracks, 12 and 14, at the position identified by dashed line 80. In addition, if the moveable object 10 is caused to move from right to left in FIG. 1, the segments of the first and second target tracks shown between dashed lines 80 and 82 would sequentially be placed immediately proximate the first and second magnetically sensitive components. If this placement of components and movement of the moveable object 10 occurs, the output signal from the first magnetically sensitive component 46 would appear as shown in FIG. 4. The two curves in FIG. 4 represent the output signal from the first magnetically sensitive component 46 under two alternative conditions. The upper curve 90 represents the signal magnitude representing the magnetic field if gap G between the first magnetically sensitive component and the moveable object 10 is equal to zero inches. Although it is realized that this zero magnitude of gap G is extremely difficult to achieve in actual practice, the curve 90 represents that theoretically output. For purposes of comparison, curve 92 represents the output of the first magnetically sensitive component if the gap G is equal to 0.020 inches. As can be seen, the relative changes in magnitude of the output signal from the first magnetically sensitive components are much more easily distinguished in curve 90 than curve 92.

With reference to FIGS. 1 and 4, it can be seen that the initial signal from the first magnetically sensitive component, when it is disposed at the position identified by line 80, is a relatively high output signal which represents slightly more than 2,200 gauss because of the presence of a magnetic segment immediately proximate the first magnetically sensitive device. As the moveable object moves from right to left in FIG. 1, a short nonmagnetic segment next passes under the first magnetically sensitive component, resulting in the reduction of the first output signal as identified by portion 94 of curve 90. Sequentially, a magnetic segment passes immediately proximate the first magnetically sensitive device and results in the increased signal 96. Subsequently, the longer nonmagnetic segment results in the reduced magnitude identified by reference numeral 98. After the longer nonmagnetic segment passes immediately proximate the first magnetically sensitive component, the signal again rises as indicated by reference numeral 99. Reference numerals, 91, 94, 96, 98 and 99 are used in FIGS. 1 and 4 to permit comparison of the magnetic and nonmagnetic segments of the first target track 12 with the changes in magnitude of curve 90. Although the movement of the first target track 12 has been described with particular reference to curve 90 in FIG. 4, it should be understood that the same discussion could alternatively relate to curve 92 if the first magnetically sensitive component had been displaced from the moveable object 10 by a gap equivalent to 0.020 inches.

Figure 5:
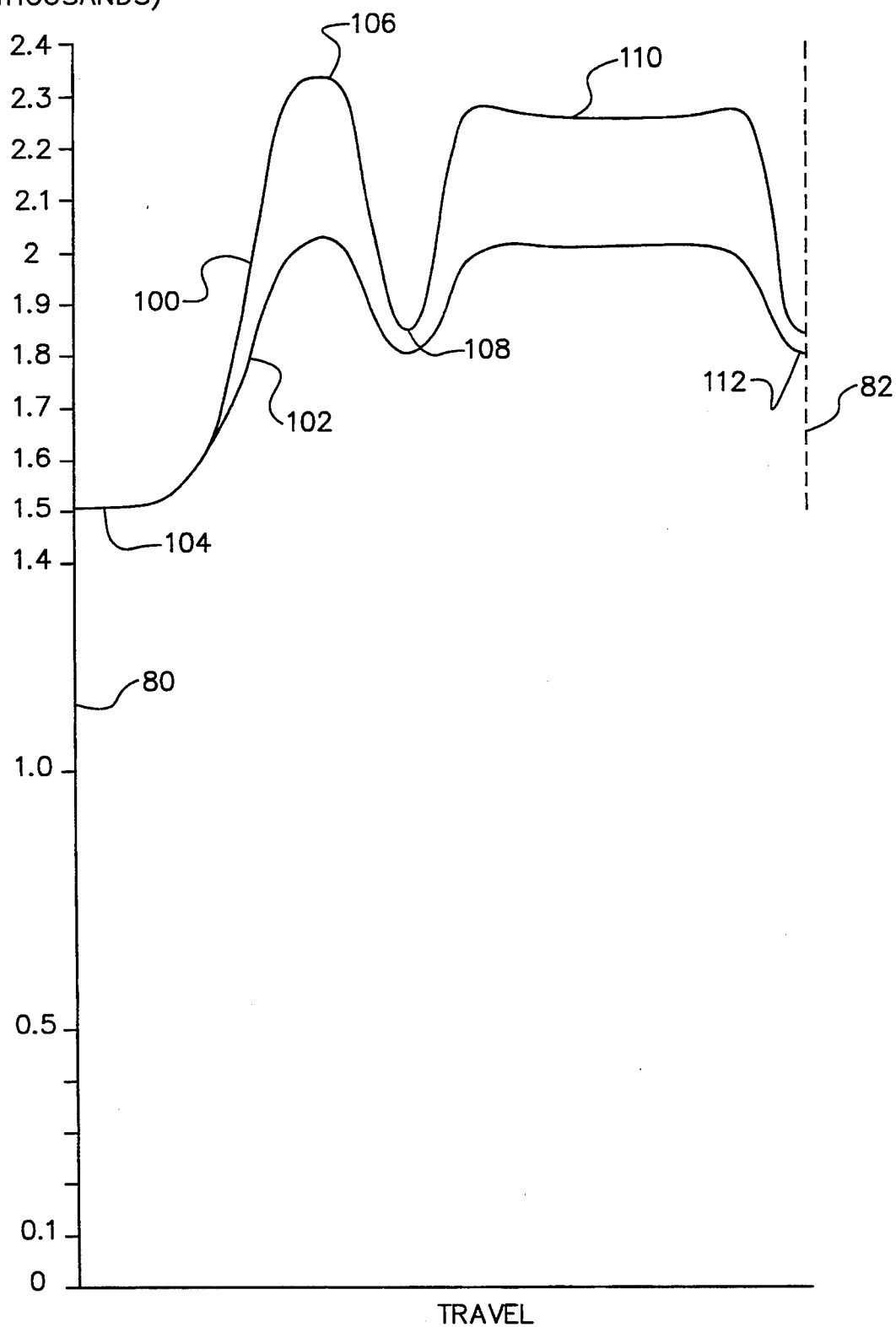
FIG. 5 shows representative curves of a second output signal of the present invention.

With reference to FIGS. 1 and 5, curves 100 and 102 represent the magnetic field strength imposed perpendicular to the second magnetically sensitive component when the moveable object 10 is moved from right to left in FIG. 1 to sequentially dispose he segments of the second target track 14 located between lines 80 and 82 immediately proximate to it. Curve 100 represents the magnetic field strength if gap G is equivalent to zero inches and curve 102 represents the magnetic strength perpendicular to the second magnetically sensitive component if gap G is 0.020 inches. With reference to FIG. 1 and to curve 100 of FIG. 5, the reduced magnitude identified by reference numeral 104 represents the signal from magnetically sensitive component 48 when it is immediately proximate the nonmagnetic segment 32 of the second target track 14 located at dashed line 80. When the subsequent magnetic segment 30 of the second target track is moved immediately proximate the second magnetically sensitive component, the signal rises to the point identified by reference numeral 106 and then drops to the magnitude identified by reference numeral 108 when the subsequent nonmagnetic segment passes the second magnetically sensitive component. When the long magnetic segment passes immediately proximate the second magnetically sensitive component, the signal again rises to that identified by reference numeral 110 prior to dropping that identified by reference numeral 112 after the magnetic segment passes completely under the second magnetically sensitive component. For purposes of comparison, reference numerals 104, 106, 108, 110 and 112 are used in FIGS. 1 and 5 to illustrate the signal strengths in FIG. 5 in comparison to the magnetic and nonmagnetic segments of the second target track 14 in FIG. 1.

Figure 6B:
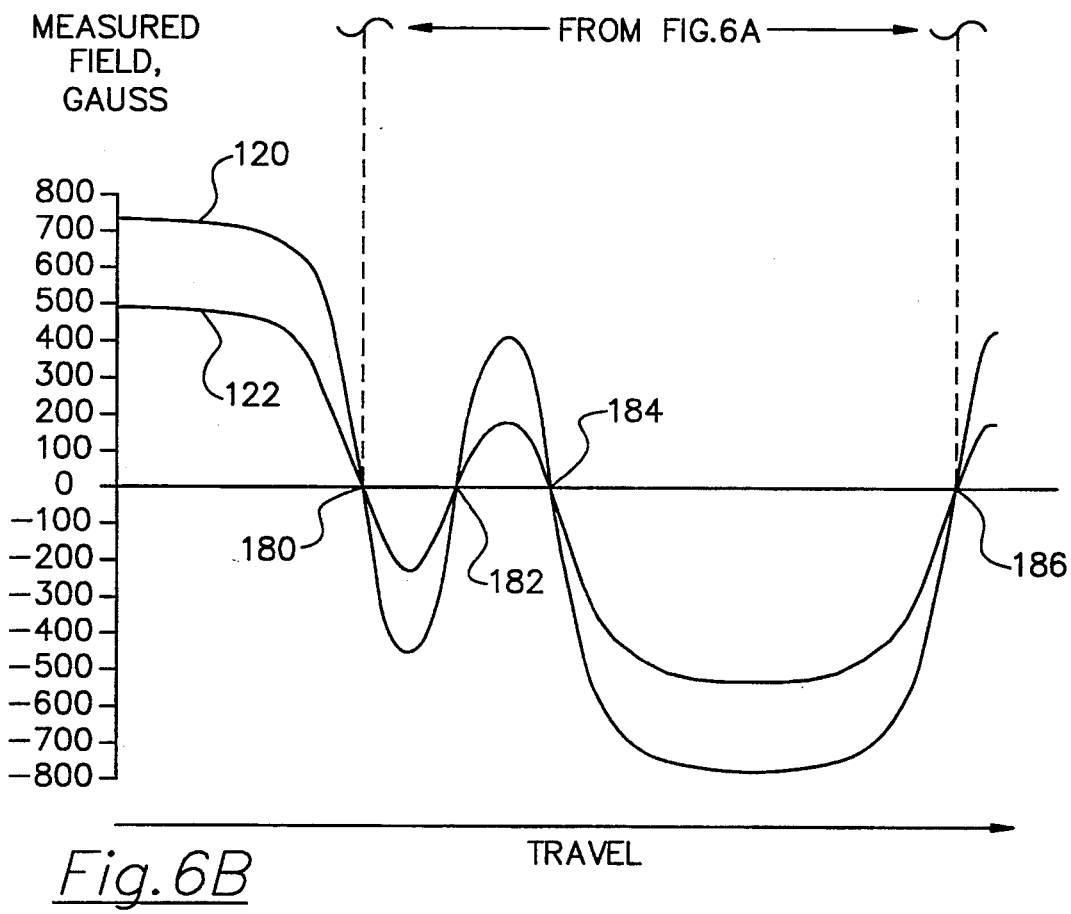
FIG. 6 illustrates a comparison between the first and second output signals of the present invention and a third output signal that is derived as a function of the first and second signals.

FIG. 6 illustrates the use of the signals shown in FIGS. 4 and 5, by the present invention, to arrive at an easily distinguishable signal which is a function of the first and second output signals. For purposes of comparison, signals 90 and 92 from FIG. 4 are illustrated in FIG. 6 and signals 100 and 102 are also shown in FIG. 6. At the bottom portion of FIG. 6, corresponding signals 120 and 122 are shown to represent the third output signal from the present invention for gaps of zero inches and 0.020 inches. For example, signal 120 in FIG. 6 is the algebraic difference between signal 90 and signal 100 if signal 100 is subtracted from signal 90. Similarly, if signal 102 is subtracted from signal 92, signal 122 is the result. In FIG. 6, several dashed lines are used to permit a comparison of the curves. For example, dashed lines 130 and 132 are provided to align the three sets of curves with each other at two positions which have arbitrarily been chosen. These positions pass through zero crossings of curves 120 and 122. In addition, dashed line 140 is provided to arbitrarily illustrate the magnitude of 2000 gauss relative to curves 90 and 92 and dashed line 142 is provided to illustrate the magnitude of 2000 gauss with respect to curves 100 and 102.

As can be seen in FIG. 6, the provision of a third output signal, which represents the algebraic difference between the first and second output signals, provides a highly distinguishable value that can be used to determine the presence or absence of magnetic segments proximate the first and second magnetically sensitive components and also permits zero crossings to be used to identify preselected positions on the first and second target tracks.

Figure 7:
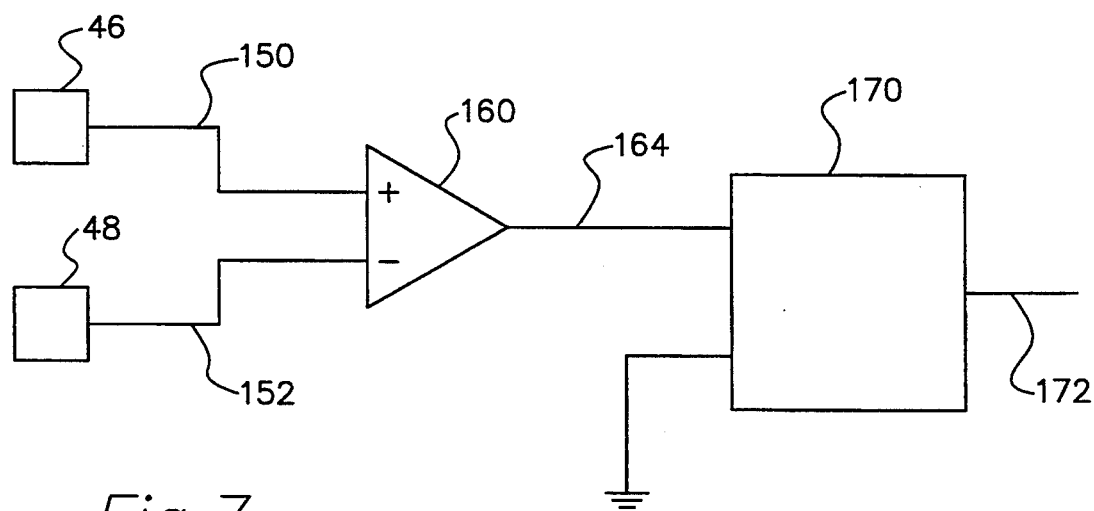
FIG. 7 illustrates one possible schematic electrical circuit that can determine a third output signal as a function of the first and second output signals of the present invention.
Figure 8:
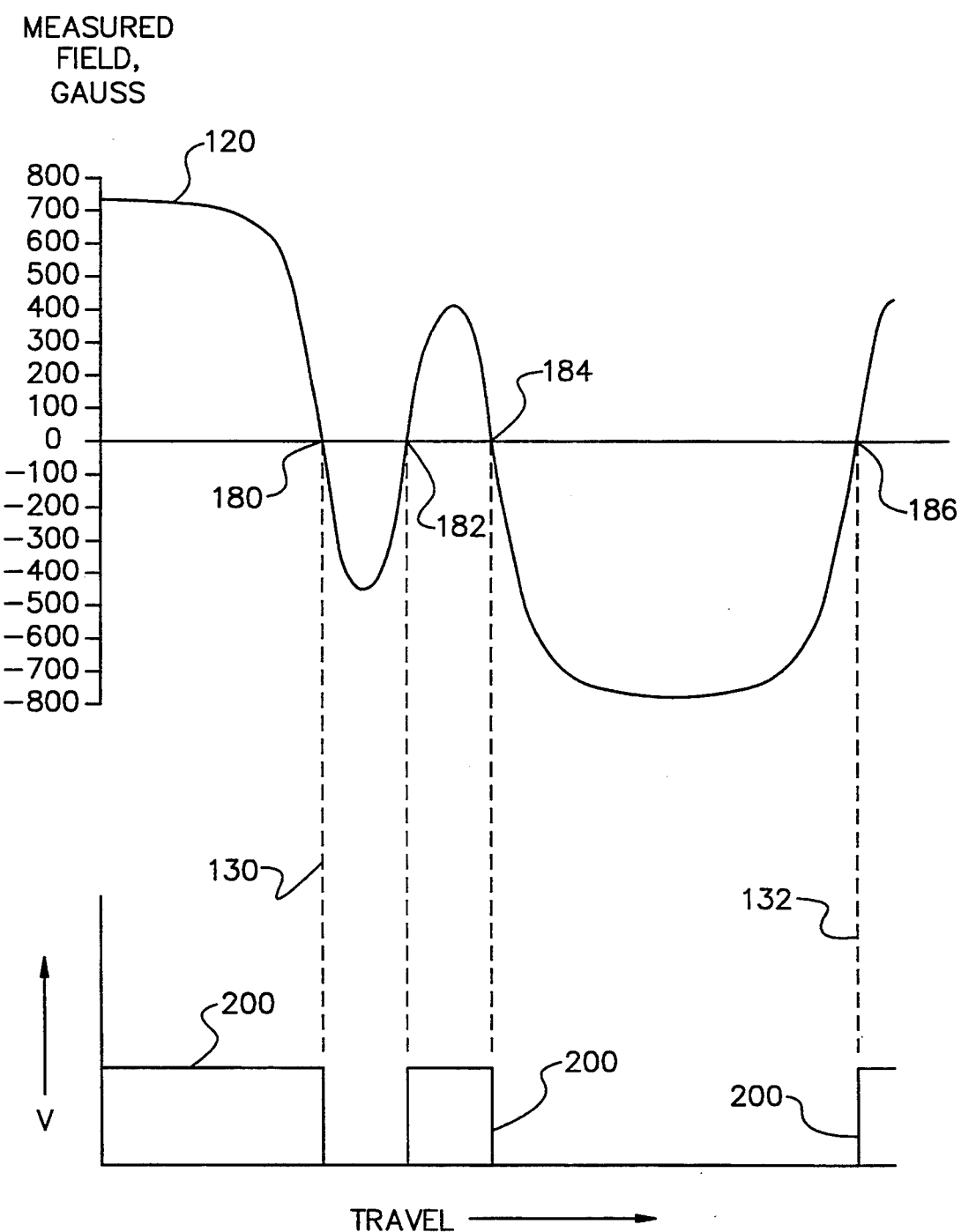
FIG. 8 shows a square wave formed in response to the third output signal of the present invention.

FIG. 7 illustrates a schematic electrical circuit which can be used to obtain the third output signal of the present invention from the first and second output signals. For example, if the first output signal from the first magnetically sensitive component 46 is provided on line 150 and the second output signal from the second magnetically sensitive component 48 is provided on line 152, a comparator 160 can be used to provide the third output signal on line 164. If, in turn, the third output signal on line 164 is provided to a comparator 170, a squarewave signal can be obtained on line 172 which is high when the first output signal is higher than the second output signal and low when the second output signal is higher than the first output signal. This squarewave signal 200 is illustrated in FIG. 8 and shows that the signal 200 on line 172 is high between the origin and dashed line 130 at the point where a zero crossing 180 is shown. The signal is then low between zero crossings 180 and 182 and is high again between zero crossings 182 and 184. When signal 120, which is the same as originally shown in FIG. 6, again becomes negative between zero crossings 184 and 186, the output on line 172 again becomes low.

Although the circuit in FIG. 7 provides one possible means for obtaining the third output signal of the present invention, it should be understood that it is intended as an example of one possible means for obtaining this signal and is not limiting to the scope of the present invention. In addition, although the algebraic difference between the first and second output signals has been used to provide the third output signal in the illustration described above and illustrated in FIGS. 6 and 7, it should also be understood that the present invention is not limited to the use of the algebraic difference between these signals. The third output signal could be a ratio of the first and second output signals.

The embodiments of the invention in which an exclusive property or right is claimed are defined as follows:

1. An angular position sensor, comprising:
   a moveable object having first and second target tracks disposed thereon, said first and second target tracks each comprising a plurality of ferromagnetic and nonferromagnetic segments alternately disposed with each other, said first and second target tracks being arranged in parallel association with each other, each ferromagnetic segment of said first target track being disposed alongside a nonferromagnetic segment of said second target track, each nonferromagnetic segment of said first target track being disposed alongside a ferromagnetic segment of said second target track, said first and second target tracks being disposed in parallel association with the direction of travel of said movable object;
   a first magnetically sensitive component disposed proximate said first target track, said first magnetically sensitive component having a first output signal representative of the magnetic field strength perpendicular to said first magnetically sensitive component;
   a second magnetically sensitive component disposed proximate said second target track, said first and second magnetically sensitive components being disposed in noncontact relation with said moveable object, said second magnetically sensitive component having a second output signal representative of the magnetic field strength perpendicular to said second magnetically sensitive component, said first and second magnetically sensitive components being positioned relative to said first and second target tracks to dispose said first and second magnetically sensitive components proximate segments of opposite magnetic characteristics for all positions of said movable object;
   a stationary magnet disposed proximate said first and second magnetically sensitive components, said first and second magnetically sensitive components being disposed between said stationary magnet and said moveable object; and
   means for providing a third output signal, said third output signal being a function of said first and second output signals.

2. The sensor of claim 1, wherein:
   said first and second magnetically sensitive components are Hall effect devices.

3. The sensor of claim 1, wherein:
   said third output signal is generally representative of the algebraic difference between the first and second output signals.

4. The sensor of claim 1, wherein:
   said third output signal is generally representative of the ratio of said first output signal to said second output signal.

5. The sensor of claim 1, wherein:
   said moveable object is generally circular and rotatable about an axis of rotation, said first and second target tracks being disposed on generally equal circumferential paths around said axis of rotation.

6. The sensor of claim 5, wherein:
   said moveable object is attached to a rotatable shaft of an automobile engine.

7. An angular position sensor, comprising:
   a first target track comprising a first series of alternating ferromagnetic and nonferromagnetic segments;
   a second target track comprising a second series of alternating ferromagnetic and nonferromagnetic segments, each ferromagnetic segment of said first target track being aligned with a nonferromagnetic segment of said second target track, each ferromagnetic segment of said second target track being aligned with a nonferromagnetic segment of said first target track;
   a first magnetically sensitive device disposed proximate said first target track, said first target track being moveable to sequentially dispose said first series of alternating ferromagnetic and nonferromagnetic segments proximate said first magnetically sensitive device;
   a second magnetically sensitive device disposed proximate said second target track, said second target track being moveable to sequentially dispose said second series of alternating ferromagnetic and nonferromagnetic segments proximate said second magnetically sensitive device; and a stationary magnet disposed proximate said first and second magnetically sensitive devices, said first and second magnetically sensitive devices being disposed between said stationary magnet and said first and second target tracks, respectively, said first magnetically sensitive device having a first output signal representative of the magnetic field strength imposed perpendicularly on said first magnetically sensitive device, said second magnetically sensitive device having a second output signal representative of the magnetic field strength imposed perpendicularly on said second magnetically sensitive device, said first and second magnetically sensitive devices being positioned relative to said first and second target tracks to dispose said first and second magnetically sensitive devices proximate segments of opposite magnetic characteristics for all positions of said first and second target tracks.

8. The sensor of claim 7, wherein:
said first and second target tracks are disposed along parallel linear paths.

9. The sensor of claim 7, wherein:
said first and second target tracks are disposed on adjacent circumferences of a generally cylindrical member for rotation about a central axis of said generally cylindrical member.

10. The sensor of claim 7, wherein:
said first and second magnetically sensitive devices are Hall effect devices.

11. The sensor of claim 7, further comprising:
means for providing a third output signal which is a function of said first and second output signals.

12. The sensor of claim 11, wherein:
said third output signal is representative of the algebraic difference of the absolute values of said first and second output signals.

13. The sensor of claim 7, wherein:
said first and second target tracks are attached to a rotatable shaft.

14. The sensor of claim 13, wherein:
said rotatable shaft is a shaft of an internal combustion engine.

15. An angular position sensor, comprising:
a moveable object having first and second target tracks disposed thereon, said first and second target tracks each comprising a plurality of ferromagnetic and nonferromagnetic segments alternately disposed with each other, said first and second target tracks being arranged in parallel association with each other, each ferromagnetic segment of said first target track being disposed alongside a nonferromagnetic segment of said second target track, each nonferromagnetic segment of said first target track being disposed alongside a ferromagnetic segment of said second target track, said first and second target tracks being disposed in parallel association with the direction of travel of said movable object;
a first magnetically sensitive component disposed proximate said first target track, said first magnetically sensitive component having a first output signal representative of the magnetic field strength perpendicular to said first magnetically sensitive component;
a second magnetically sensitive component disposed proximate said second target track, said first and second magnetically sensitive components being disposed in noncontact relation with said moveable object, said second magnetically sensitive component having a second output signal representative of the magnetic field strength perpendicular to said second magnetically sensitive component, said first and second magnetically sensitive components being positioned relative to said first and second target tracks to dispose said first and second magnetically sensitive components proximate segments of opposite magnetic characteristics for all positions of said movable object;
a stationary magnet disposed proximate said first and second magnetically sensitive components, said first and second magnetically sensitive components being disposed between said stationary magnet and said moveable object; and
means for providing a third output signal, said third output signal being a function of said first and second output signals, said first and second magnetically sensitive components being Hall effect devices, said third output signal being generally representative of the algebraic difference between the first and second output signals, said moveable object being generally circular and rotatable about an axis of rotation, said first and second target tracks being disposed on generally equal circumferential paths around said axis of rotation.

16. The sensor of claim 15, wherein:
said moveable object is attached to a rotatable shaft of an automobile engine.

* * * * *